United States Patent [19]

Beach et al.

[11] Patent Number: 5,254,160
[45] Date of Patent: Oct. 19, 1993

[54] MAGENTA DYE, JET INK, AND COLOR SET

[75] Inventors: Bradley L. Beach; Kathryn E. Burns, both of Lexington, Ky.; James F. Feeman, Wyomissing, Pa.; Ann M. Piekunka; Agnes K. Zimmer, both of Lexington, Ky.

[73] Assignee: Lexmark International, Inc., Greenwich, Conn.

[21] Appl. No.: 990,480

[22] Filed: Dec. 14, 1992

[51] Int. Cl.$^5$ ............................................. C09D 11/02
[52] U.S. Cl. ................................. 106/22 K; 534/841; 534/842
[58] Field of Search ............... 106/22 K, 22 R; 534/841, 842

[56] References Cited

U.S. PATENT DOCUMENTS

| | | | |
|---|---|---|---|
| 2,720,517 | 10/1955 | Kartaschoff et al. | 534/841 |
| 4,631,085 | 12/1986 | Kawanishi et al. | 106/22 K |
| 4,703,113 | 10/1987 | Baxter et al. | 106/22 K |
| 4,769,446 | 9/1988 | Corso et al. | 534/642 |
| 4,841,027 | 6/1989 | Kayane et al. | 534/841 |
| 5,074,914 | 12/1991 | Shirota et al. | 106/22 K |
| 5,102,459 | 4/1992 | Ritter et al. | 106/22 R |
| 5,118,350 | 6/1992 | Prasad | 106/22 |
| 5,143,547 | 9/1992 | Kappele | 106/22 R |

FOREIGN PATENT DOCUMENTS

| | | | |
|---|---|---|---|
| 53574 | 3/1985 | Japan | 534/841 |
| 81250 | 5/1985 | Japan | 534/841 |
| 2131825 | 6/1984 | United Kingdom | 534/841 |

Primary Examiner—Helene Klemanski
Attorney, Agent, or Firm—John A. Brady

[57] ABSTRACT

A water-soluble dye for a color subtractive, lightfast, wide spectrum ink as follows:

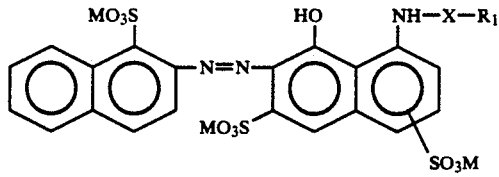

wherein:
X is

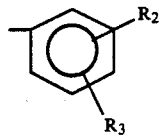

$R_1$ is:
an aliphatic radical having from 1 to 18 carbon atoms; the radical

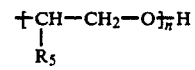

in which
$R_2$ is —H, -lower alkyl of 1 to 4 C atoms, -lower alkoxy, -halogen, —$NO_2$ —CN, —$CO_2H$;
$R_3$ is —H, -lower alkyl having 1 to 4 C atoms, -halogen, —$CO_2H$;
M is H, Li, Na, K, —$N(R_4)_4$ in which $R_4$ is H, $$+CH-CH_2-O\!\!+_{\!n}\!H$$
$$\phantom{+CH}|\phantom{-CH_2-O+_nH}$$
$$\phantom{+CH}R_5$$

in which
$R_5$ is —H, -lower alkyl, and
$n$ is 1 to 4; and in which one of the —$SO_3M$ groups on the amino-naphthol radical is positioned meta or para —$SO_3M$ is meta to the —OH.

and the dye in a water and glycol vehicle. A dye set of this dye, Direct Blue 199, and Direct Yellow 132 provides a full color spectrum of bright, lightfast colors.

15 Claims, No Drawings

MAGENTA DYE, JET INK, AND COLOR SET

TECHNICAL FIELD

This invention relates to dyes for use in liquid inks, to inks containing such dyes, and to color subtractive inks used to image a full range of colors.

BACKGROUND OF THE INVENTION

The magenta dye molecule of this invention is exceptionally lightfast and provides a full visible range of strong colors when used with other color-subtractive dyes. It is readily soluble in polar solvents. The following patents disclose dyes having some structural similarity of this magenta dye, but which are clearly different chemically: U.S. Pat. No. 5,102,459 to Ritter et al and U.S. Pat. No. 5,074,914 to Shirota et al, and U.S. Pat. No. 4,769,446 to Corso et al. U.S. Pat. No. 5,118,350 to Prasad is illustrative of color set, but not of the specific dyes of this invention.

DISCLOSURE OF THE INVENTION

This invention includes a dye per se of the following structural formula.

Dye Structural Formula:

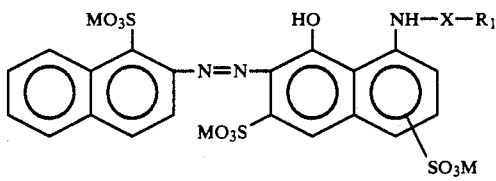

wherein:
X is

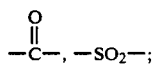

$R_1$ is:
  an aliphatic radical having from 1 to 18 carbon atoms;
  the radical

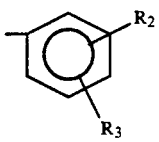

in which
  $R_2$ is —H, -lower alkyl of 1 to 4 C atoms, -lower alkoxy, -halogen, —$NO_2$ —CN, —$CO_2H$;
  $R_3$ is —H, -lower alkyl having 1 to 4 C atoms, -halogen, —$CO_2H$;
  M is H, Li, Na, K, —$N(R_4)_4$ in which $R_4$ is H,

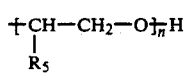

in which
  $R_5$ is —H, -lower alkyl, and
  $n$ is 1 to 4; and in which one of the —$SO_3M$ groups on the amino-naphthol radical is positioned meta or para to the —NH— group and the other —$SO_3M$ is meta to the —OH.

These dyes provide subtractive magenta hues having exceptional lightfastness and provide a full visible range of strong colors when used with other subtractive dyes of other colors. These dyes readily dissolve in polar solvents, such as water and alcohol mixtures, to form inks for ink jet printers. A representative ink has at least 1 percent by weight dye, more specifically 1 to 5 percent by weight dye, a minor amount of a glycol, and the balance water.

When used in a dye set with Direct Blue 199 and Direct Yellow 132, a full color spectrum of bright, lightfast colors is obtained.

BEST MODE FOR CARRYING OUT THE INVENTION

The preferred dye of this invention has the structural formula:

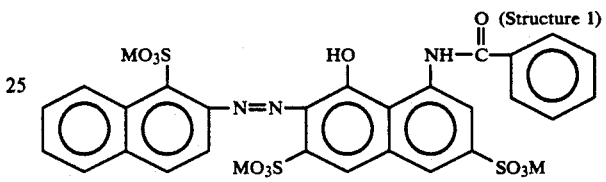

wherein M is H, Li, Na, K, —$NH_4$.
The preferred ink formula is as follows:

| Ingredient | Weight in Grams |
|---|---|
| Foregoing preferred Dye | 3 |
| Tetraethylene glycol | 10 |
| Deionized (DI) water | 87 |

The dye readily dissolves in the glycol and water with stirring. The glycol is a humectant, meaning it contributes to the water solubility of the dye. The resulting ink is suitable as a drop-on-demand or other ink jet ink. Upon application to paper or the like, the dye attaches to the paper surfaces without spreading and the water spreads and evaporates, leaving a fixed, subtractive magenta color at the area of application of the ink. Resistance to fading or other discoloration from light radiation is excellent.

The acid form of other examples of such magenta dyes having similar characteristics as the foregoing described characteristics of the preferred dye are as follows. These are less preferred merely because of slight differences in color characteristics. Other examples will be obvious to those skilled in the art, using structural features included in the generic formula.

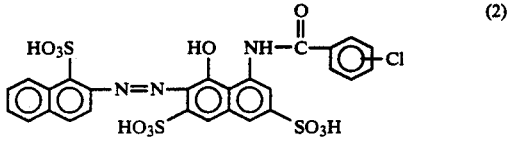

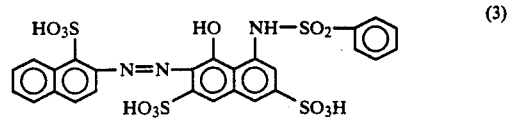

-continued

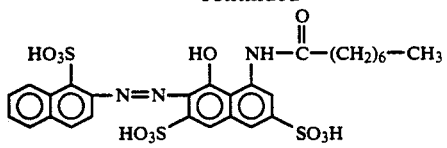 (4)

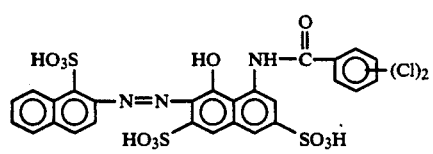 (5)

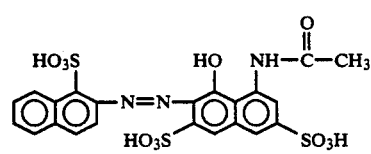 (6)

DYE SYNTHESIS

The sodium salt form of this preferred dye (1 above) may be obtained in laboratory quantities as follows:

22.3 parts of 2-amino-1-naphthalenesulfonic acid is slurried in 200 parts of water and 20 parts of 37% hydrochloric acid, cooled to 10° C. by addition of ice and maintained at 10°-15° C. while diazotizing by addition of a solution of 7 parts of sodium nitrile in 35 parts of water during about one hour, as absorbed. A slight excess of nitrous acid is removed by addition of sulfamic acid. The yellow precipitate is filtered.

A solution is prepared of 46.8 parts of 1-benzoylamino-8-naphthol-3,6-disulfonic acid, disodium salt, in 200 parts of water at pH 5.5. Ice is added to cool the solution to 0° C. The diazo paste is added with good stirring. The pH is then raised to 8.5-9.0 by slow addition of sodium carbonate. A deep red solution results. After stirring for one hour the pH is reduced to 7.5 with hydrochloric acid. To the dye solution (400 parts) is added 40 parts (10% on volume) of sodium chloride. The product crystallizes out, is filtered and the filter cake is washed with 100 parts of 25% sodium chloride solution. The cake is dried giving dye having structure 1 as its disodium salt.

To prepare laboratory quantities of the sodium salts of the other examples numbered above, while otherwise proceeding as described, the 1-benzoylamino-8-naphthol-36-disulfonic acid, disodium salt, is replaced by an equimolar amount of the following intermediates:

(2) 1-(2',3', or 4'-chorobenzoylamino)-8-naphthol-3, 6-disulfonic acid, disodium salt;
(3) 1-benzenesulfonylamino-8-naphthol-3, 6-disulfonic acid, disodium salt;
(4) 1-octanoylamino-8-naphthol-3, 6-disulfonic acid, disodium salt;
(5) 1-(3', 5'-dichlorobenzoyl)-amino-8-naphthol-3, 6-disulfonic acid, disodium salt;
(6) 1-acetylamino-8-naphthol-3, 6-disulfonic acid, disodium salt.

Other salt forms, such as potassium, lithium, ammonium, and alkanolammonium, for example, may be readily prepared in known manner, by proceeding from the corresponding salts of the intermediates, or by conversion of the sodium salts of the dyes, i.e. by isolating the dyes as the free acids, removing the Na ion by filtration, followed by neutralization with the appropriate alkali hydroxide or carbonate, ammonia, or alkanolamine, as desired.

DYE SET

The foregoing inks are used with subtractive inks of the two other primary colors to obtain a full spectrum of bright, lightfast color imaging. The magenta ink is as described above.

| Blue Ink Formula | |
|---|---|
| Ingredient | Weight in Grams |
| Direct Blue 199 | 3 |
| Tetraethylene glycol | 10 |
| DI Water | 87 |

Direct Blue 199 is a sulfonated copper phthalocyanine dye, a proprietary product of Imperial Chemical Industries PLC and other firms.

| Yellow Ink Formula | |
|---|---|
| Ingredient | Weight in Grams |
| Direct Yellow 132 | 3 |
| Tetraethylene glycol | 10 |
| DI Water | 87 |

Direct Yellow 132 is a sulfonated azo dye, a proprietary product of Imperial Chemical Industries PLC and other firms.

The glycol is a humectant.

The three ink formulas fix their dye on paper without spreading when applied, for example, as jet ink drops. The colors are typically applied in time sequence and as successive layers, to achieve different color appearance from those of the primary substractive colors, as may be entirely conventional with respect to this invention. For example, a layer of the magenta on top of or under a layer of the cyan shows blue under white light and such a lamination of the magenta and the yellow shows red under white light, as is widely understood and practiced.

The dyes are readily soluble. As is widely practiced, to avoid high acidity such dyes are used in inks in their salt forms, preferably sodium or lithium. Variations in ink formulas such as more than one humectant, a buffer, a biocide, and a chelating agent can be anticipated as well as other variations within the spirit and scope of this invention. Specific additions contemplated are:

0.1% EDTA; ethylenediaminetetraacetic acid, tetrasodium salt;
0.2% biocide;
0.75% Na phosphate, dibasic heptahydrate (buffer).

What is claimed is:

1. A dye of the structural formula:

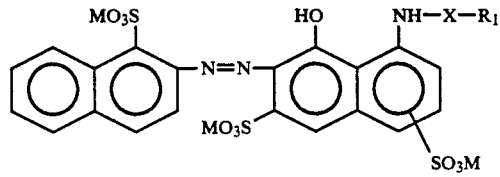

wherein:
X is

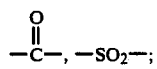

R₁ is:
an aliphatic radical having from 7 to 18 carbon atoms;
the radical

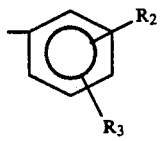

in which
R₂ is -lower alkoxy, -halogen, —NO₂ —CN, —CO₂H;
R₃ is —H, -lower alkyl having 1 to 4 C atoms, -halogen, —CO₂H;
M is H, Li, Na, K, —N(R₄)₄ in which R₄ is H,

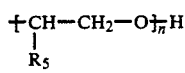

in which
R₅ is —H, -lower alkyl, and
$n$ is 1 to 4; and in which
one of the —SO₃M groups on the amino-naphthol radical is positioned meta or para to the —NH— group and the other —SO₃M is meta to the —OH.

2. The dye of claim 1 of structural formula:

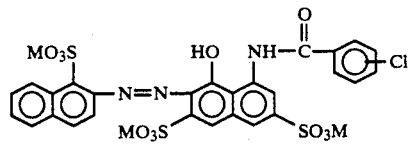

3. The dye of claim 1 of structural formula:

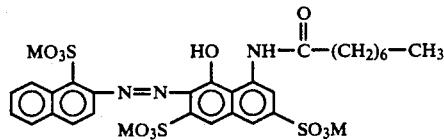

4. The dye of claim 1 of structural formula:

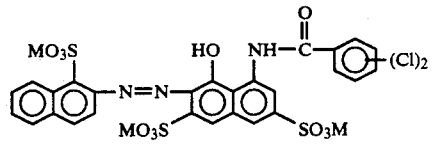

5. A lightfast ink comprising at least 1 percent by weight of a dye dissolved in a polar vehicle, said dye being of the structural formula;

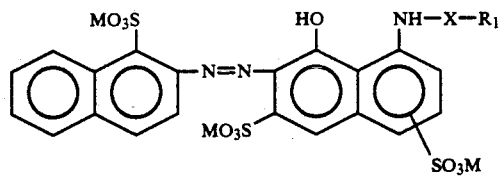

wherein:
X is

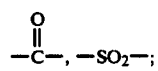

R₁ is:
an aliphatic radical having from 7 to 18 carbon atoms;
the radical

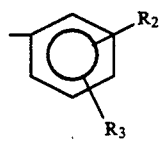

in which
R₂ is -lower alkoxy, -halogen, —NO₂ —CN, —CO₂H;
R₃ is —H, -lower alkyl having 1 to 4 C atoms, -halogen, —CO₂H;
M is H, Li, Na, K, —N(R₄)₄ in which R₄ is H,

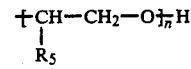

in which
R₅ is —H, -lower alkyl, and
$n$ is 1 to 4; and in which
one of the —SO₃M groups on the amino-naphthol radical is positioned meta or para to the —NH— group and the other —SO₃M is meta to the —OH.

6. The ink of claim 5 in which the dye is of structural formula:

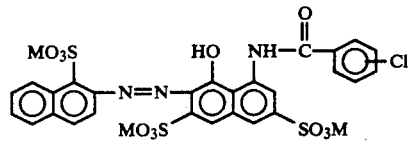

7. The ink of claim 5 in which the dye is of structural formula:

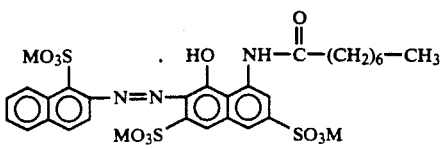

8. The ink of claim 5 in which the dye is of structural formula:

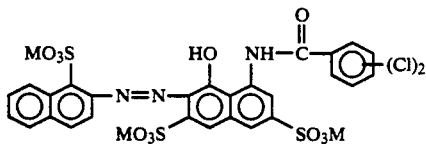

9. A set of inks comprising a magenta ink, a cyan ink and a yellow ink, said magenta ink comprising a magenta dye of the structure formula:

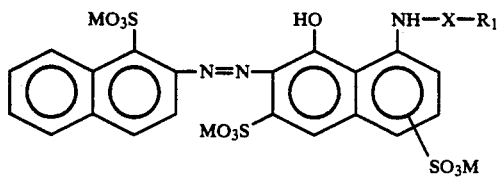

wherein:
X is

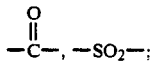

$R_1$ is:
an aliphatic radical having from 1 to 18 carbon atoms;
the radical

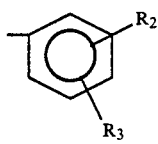

in which
$R_2$ is —H, -lower alkyl of 1 to 4 C atoms, -lower alkoxy, -halogen, —$NO_2$ —CN, —$CO_2H$;
$R_3$ is —H, -lower alkyl having 1 to 4 C atoms, -halogen, —$CO_2H$;
M is H, Li, Na, K, —$N(R_4)_4$ in which $R_4$ is H,

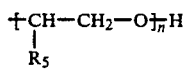

in which
$R_5$ is —H, -lower alkyl, and
$n$ is 1 to 4; and in which
one of the —$SO_3M$ groups on the amino-naphthol radical is positioned meta or para to the —NH— group and the other —$SO_3M$ is meta to the —OH dissolved in a polar solvent,
said cyan ink comprising Direct Blue 199 dissolved in a polar solvent, and
said yellow in comprising Direct Yellow 132 dissolved in a polar solvent.

10. The set of inks as in claim 9 in which said magenta dye is a dye of structural formula:

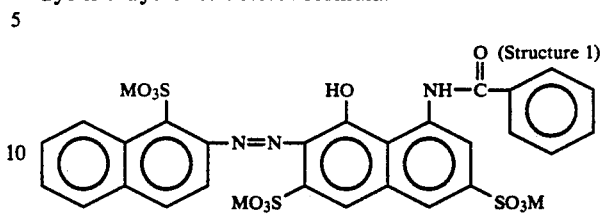

11. The set of inks as in claim 9 in which said magenta dye is a dye of structural formula:

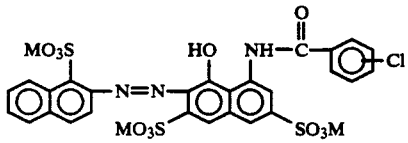

12. The set of inks as in claim 9 in which said magenta dye is a dye of a structural formula:

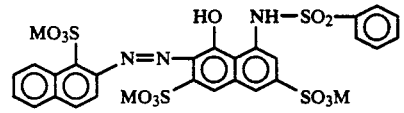

13. The set of inks as in claim 9 in which said magenta dye is a dye of structural formula:

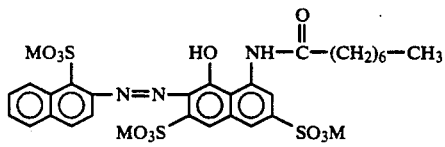

14. The set of inks as in claim 9 in which said magenta dye is a dye of structural formula:

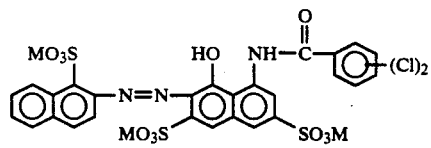

15. The set of inks as in claim 9 in which said magenta dye is a dye of structural formula:

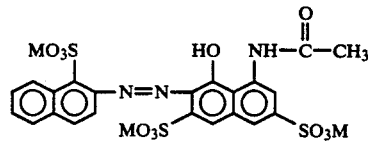

* * * * *